US012723131B2

(12) United States Patent
Gillissen et al.

(10) Patent No.: US 12,723,131 B2
(45) **Date of Patent: *Sep. 1, 2026**

(54) POLYESTERS

(71) Applicant: The Procter & Gamble Company, Cincinnati, OH (US)

(72) Inventors: Martijn Gillissen, Bocholtz (NL); Hiroe Yamada, Frankfurt am Main (DE); Gang Si, Newcastle upon Tyne (GB); Michael McDonnell, Newcastle upon Tyne (GB)

(73) Assignee: The Procter & Gamble Company, Cincinnati, OH (US)

( * ) Notice: Subject to any disclaimer, the term of this patent is extended or adjusted under 35 U.S.C. 154(b) by 738 days.

This patent is subject to a terminal disclaimer.

(21) Appl. No.: 17/777,978

(22) PCT Filed: Dec. 7, 2020

(86) PCT No.: PCT/EP2020/084961

§ 371 (c)(1),
(2) Date: May 18, 2022

(87) PCT Pub. No.: WO2021/116049

PCT Pub. Date: Jun. 17, 2021

(65) Prior Publication Data

US 2023/0012337 A1 Jan. 12, 2023

(30) Foreign Application Priority Data

Dec. 9, 2019 (EP) .................................... 19214577

(51) Int. Cl.

| | |
|---|---|
| ***C08G 63/672*** | (2006.01) |
| ***C08G 63/48*** | (2006.01) |
| ***C08G 63/685*** | (2006.01) |
| ***C08G 63/688*** | (2006.01) |
| ***C08G 63/91*** | (2006.01) |
| ***C08L 67/02*** | (2006.01) |
| ***C08L 67/08*** | (2006.01) |
| ***C11D 3/00*** | (2006.01) |
| ***C11D 3/37*** | (2006.01) |

(52) U.S. Cl.

CPC ....... *C08G 63/672* (2013.01); *C08G 63/6856* (2013.01); *C11D 3/0036* (2013.01); *C11D 3/3715* (2013.01); *C11D 2111/12* (2024.01)

(58) Field of Classification Search

None

See application file for complete search history.

(56) References Cited

U.S. PATENT DOCUMENTS

| | | | | |
|---|---|---|---|---|
| 2,182,306 | A | | 12/1939 | Ulrich |
| 2,208,095 | A | | 7/1940 | Esselmann |
| 2,553,696 | A | | 5/1951 | Wilson |
| 2,806,839 | A | | 9/1957 | Crowther |
| 3,033,746 | A | | 5/1962 | Moyle |
| 3,893,929 | A | | 7/1975 | Basadur |
| 3,959,230 | A | | 5/1976 | Hays |
| 3,962,152 | A | | 6/1976 | Nicol |
| 4,132,680 | A | | 1/1979 | Nicol |
| 4,374,716 | A | * | 2/1983 | Pacifici ............. C08G 63/6856 522/143 |
| 4,702,857 | A | | 10/1987 | Gosselink |
| 4,711,730 | A | | 12/1987 | Gosselink |
| 4,713,194 | A | | 12/1987 | Gosselink |
| 4,759,876 | A | | 7/1988 | Crossin |
| 4,760,100 | A | | 7/1988 | Mcdaniel |
| 4,956,447 | A | | 9/1990 | Gosselink |
| 5,142,020 | A | | 8/1992 | Kud |
| 5,239,019 | A | * | 8/1993 | Halling ................. D04H 1/435 528/495 |
| 6,153,723 | A | | 11/2000 | Lang |
| 6,255,274 | B1 | | 7/2001 | Becherer |
| 6,537,961 | B1 | | 3/2003 | Koch |
| 7,790,665 | B2 | | 9/2010 | Lang |
| 9,365,806 | B2 | | 6/2016 | Carswell |
| 9,732,308 | B2 | | 8/2017 | Fischer |
| 10,087,400 | B2 | | 10/2018 | Klug |
| 10,240,107 | B2 | | 3/2019 | Cohrs |
| 10,351,802 | B2 | | 7/2019 | Cohrs |
| 10,961,484 | B2 | | 3/2021 | Klug |
| 2001/0005737 | A1 | | 6/2001 | Loffler |
| 2004/0254091 | A1 | | 12/2004 | Crass |
| 2009/0036641 | A1 | | 2/2009 | Lang |
| 2010/0098655 | A1 | | 4/2010 | Lang |
| 2011/0095109 | A1 | | 4/2011 | Borchers |
| 2011/0098418 | A1 | | 4/2011 | Morschhaeuser |

(Continued)

FOREIGN PATENT DOCUMENTS

| | | |
|---|---|---|
| CN | 1182751 | 5/1998 |
| CN | 104508000 | 4/2015 |

(Continued)

OTHER PUBLICATIONS

Co-pending U.S. Appl. No. 17/777,978, filed May 18, 2022.
International Search Report for PCT/EP2018/082718, dated Jan. 28, 2019, 2 pages.
International Search Report for PCT/EP2019/062165 dated Nov. 28, 2019, 3 pages.
International Search Report for PCT/EP2021/063267, dated Jul. 20, 2021, 13 pages.
International Search Report for PCT/EP2013/002194, dated Sep. 20, 2013. 1 page.

(Continued)

*Primary Examiner* — Ha S Nguyen

(74) *Attorney, Agent, or Firm* — Abigail O. Idokogi

(57) ABSTRACT

The present invention relates to specific polyesters which are particularly suitable for use in fabric treatment applications, such as in fabric care and laundry detergent products. In such applications, the polyesters exhibit improved freshness performance, and especially good anti-malodor performance.

19 Claims, No Drawings

(56) References Cited

U.S. PATENT DOCUMENTS

2012/0309665 A1 12/2012 Morschhaeuser
2013/0200290 A1 8/2013 Morschhaeuser
2015/0166938 A1 6/2015 Fischer
2015/0203630 A1 7/2015 Fischer
2015/0218491 A1 8/2015 Morschhaeuser
2015/0240029 A1 8/2015 Fischer
2016/0280847 A1 9/2016 Müssig
2016/0311208 A1 10/2016 Nederberg
2017/0145348 A1 * 5/2017 Klug .................... C11D 3/2068
2017/0321154 A1 11/2017 Cohrs
2017/0327773 A1 11/2017 Cohrs
2019/0330565 A1 10/2019 Mutch
2020/0063070 A1 2/2020 Mutch
2020/0207910 A1 7/2020 Mutch
2020/0255766 A1 8/2020 Green
2020/0407494 A1 12/2020 Mutch
2021/0188759 A1 6/2021 Cohrs
2021/0189290 A1 6/2021 Cohrs
2021/0261728 A1 8/2021 Arndt
2021/0371588 A1 12/2021 Mutch

FOREIGN PATENT DOCUMENTS

DE 19502181 A1 8/1996
DE 19735715 A1 2/1999
DE 102007005532 8/2008
DE 102007013217 A1 9/2008
EP 0035263 9/1981
EP 0185427 6/1986
EP 0199403 A2 10/1986
EP 0336595 10/1989
EP 0398137 11/1990
EP 0442101 A1 8/1991
EP 0523956 1/1993
EP 0964015 12/1999
EP 1106169 A2 6/2001
EP 1106169 A3 10/2001
EP 1966273 A1 9/2008
EP 2135931 12/2009
EP 2276824 A1 1/2011
EP 2692842 2/2014
EP 2966160 A1 1/2016
EP 3071625 9/2016
EP 3235848 A1 10/2017
EP 3360911 8/2018
EP 3710571 9/2020
GB 1088984 A 10/1967
GB 1466639 A 3/1977
JP 2003073657 A * 3/2003
JP 2015105373 A 6/2015
WO 9850509 11/1998
WO 0158980 8/2001
WO 2006133867 A1 12/2006
WO 2007079850 7/2007
WO 2007138054 A1 12/2007
WO 2009138177 11/2009
WO 2009153184 12/2009
WO 2011000158 1/2011
WO 2012104159 8/2012
WO 2014019792 2/2014
WO 2016075178 A1 5/2016
WO 2016075179 A1 5/2016
WO 2018103895 6/2018
WO 2019105939 6/2019
WO 2019224030 A1 11/2019
WO WO2019224030 11/2019

OTHER PUBLICATIONS

Machine translation of DE 102007013217, Sep. 18, 2008. 26 pages.
Written Opinion of the International Searching Authoirty for PCT/EP2013/002194, dated Sep. 19, 2013. 4 pages.

* cited by examiner

POLYESTERS

The invention relates to polyesters, a process for their preparation and solutions or dispersions comprising the polyesters. The polyesters are particularly suitable for use in fabric treatment applications, such as fabric care and laundry detergent products. In such applications, the polyesters exhibit improved freshness performance and especially good anti-malodor performance.

Consumers use laundry compositions during the laundry process. Such laundry compositions provide cleaning, freshness and/or care benefits to the fabrics during the laundry operation. Recently, a developing need for laundry compositions is ensuring that malodors on fabrics are reduced to a minimum during the laundry process. Malodor is also a growing problem in other consumer product areas. For example, dish washers may generate malodor when consumer washing habits change to lower temperatures and shorter wash cycles. Also, for example, malodor generated on implements, e.g. used in manual dish washing (such as a sponge), becomes a problem for consumers who use an implement in their manual dish washing.

Malodors are typically caused by adherence of soils, especially hydrophobic soils such as body soils, cooking oils, and non-food oils onto surfaces, such as fabrics, and especially onto hydrophobic fabrics.

Therefore, it was the object of the present invention to provide substances which e.g. may be used in fabric care applications such as laundry applications and provide improved freshness performance, and especially good anti-malodor performance.

Surprisingly, this object may be solved by polyesters comprising

A) one or more structure units of the formula (I)

(I)

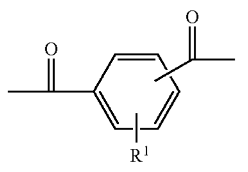

wherein $R_1$ is H or $SO_3^-$ 1/p $M^{p+}$, and

1/p $M^{p+}$ is a cation, preferably selected from the group consisting of monovalent cations $M^+$ (p=1), divalent cations ½ $M^{2+}$ (p=2) and trivalent cations ⅓ $M^{3+}$ (p=3) and more preferably selected from the group consisting of $H^+$, $Li^+$, $Na^+$, $K^+$, ½ $Mg^{2+}$, ½ $Ca^{2+}$, ⅓ $Al^{3+}$, $NH_4^+$ and $R^aR^bR^cR^dN^+$, wherein $R^a$, $R^b$, $R^c$ and $R^d$, independently of one another, are H, linear or branched, preferably linear, $(C_1-C_{22})$-alkyl groups or linear or branched, preferably linear, $(C_2-C_{10})$-hydroxyalkyl groups, and wherein in the cations $R^aR^bR^cR^dN^+$ at least one of $R^a$, $R^b$, $R^c$ and $R^d$ is not H, and B) one or more structure units of the formula (II)

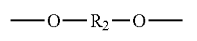

(II)

wherein $R_2$ is a linear or branched alkylene group represented by the formula $(C_mH_{2m})$ wherein m is an integer from 2 to 10, preferably from 2 to 6, and more preferably is 2, 3, 4 or 6, and C) one or more structure units selected from the group consisting of the formulae (III-a), (III-b), (III-c) and combinations thereof, (III-a)

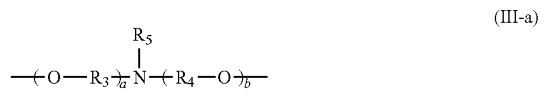

(III-b)

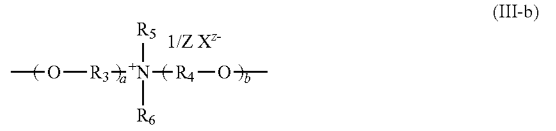

(III-c)

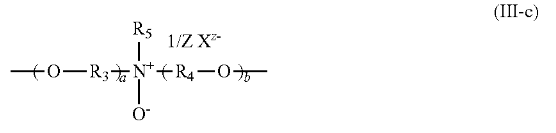

wherein $R_3$ and $R_4$ are, independently of one another, selected from linear or branched alkylene groups represented by the formula $(C_nH_{2n})$ wherein n is 2, 3 or 4, $R_5$ is a group of the formula $-(C_jH_{2j}O)_k-R_{98}$, wherein j is 2, 3 or 4, preferably 2, k is, based on a molar average, a number from 0 to 10, preferably from 0 to 5, more preferably from 0 to 2 and even more preferably is 0, and $R_{98}$ is selected from the group consisting of alkyl, alkenyl, hydroxyalkyl, hydroxyalkenyl, phenyl alkyl, phenyl alkenyl, alkyl phenyl, and alkenyl phenyl, wherein the alkyl and alkenyl groups, either as such or as a part of the aforementioned hydroxyalkyl, hydroxyalkenyl, phenyl alkyl, phenyl alkenyl, alkyl phenyl or alkenyl phenyl groups, contain 6 or more than 6 carbon atoms, preferably from 6 to 30 carbon atoms and more preferably from 6 to 22 carbon atoms, $R_6$ is a group of the formula $-(C_{j1}H_{2j1}O)_{k1}-R_{99}$, wherein j1 is 2, 3 or 4, preferably 2, k1 is, based on a molar average, a number from 0 to 10, preferably from 0 to 5, more preferably from 0 to 2 and even more preferably is 0, and $R_{99}$ is selected from the group consisting of hydrogen, alkyl, alkenyl, hydroxyalkyl, hydroxyalkenyl, phenyl alkyl, phenyl alkenyl, alkyl phenyl, and alkenyl phenyl, wherein the alkyl groups, either as such or as a part of the aforementioned hydroxyalkyl, phenyl alkyl or alkyl phenyl groups, contain from 1 to 30 carbon atoms, preferably from 1 to 22 carbon atoms and more preferably from 1 to 6 carbon atoms, and wherein the alkenyl groups, either as such or as a part of the aforementioned hydroxyalkenyl, phenyl alkenyl or alkenyl phenyl groups, contain from 2 to 30 carbon atoms, preferably from 2 to 22 carbon atoms and more preferably from 2 to 6 carbon atoms, a and b are, based on a molar average, independently of one another, numbers from 1 to 200, preferably from 1 to 100, more preferably from 1 to 50, even more preferably from 1 to 25, and particularly preferably from 1 to 10, and 1/z $X^{z-}$ is an anion, preferably selected from the group consisting of monovalent anions $X^-$ (z=1), divalent anions $\frac{1}{2}X^{2-}$ (z=2) and trivalent anions $\frac{1}{3}X^{3-}$ (z=3) and more preferably selected from the group consisting of $Cl^-$ (chloride), $Br^-$ (bromide), $CH_3—SO_4^-$ (methyl sulfate), $C_2H_5—SO_4^-$ (ethyl sulfate), $HCOO^-$ (formate), $\frac{1}{3}$ $C(OH)(COO^-)(CH_2COO^-)_2$ (citrate), $CH_3—COO^-$ (acetate), $NO_3^-$ (nitrate), $\frac{1}{2}$ $CO_3^{2-}$ (carbonate), $\frac{1}{2}$ $SO_4^{2-}$ (sulfate) and $\frac{1}{3}$ $PO_4^{3-}$ (PHOSPHATE).

Therefore, a subject matter of the present invention is polyesters comprising

A) one or more structure units of the formula (I)

(I)

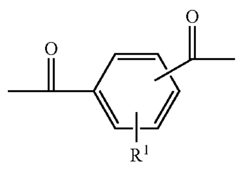

wherein $R_1$ is H or $SO_3^-$ 1/p $M^{p+}$, and

1/p $M^{p+}$ is a cation, preferably selected from the group consisting of monovalent cations $M^+$ (p=1), divalent cations $\frac{1}{2}$ $M^{2+}$ (p=2) and trivalent cations $\frac{1}{3}$ $M^{3+}$ (p=3) and more preferably selected from the group consisting of $H^+$, $Li^+$, $Na^+$, $K^+$, $\frac{1}{2}$ $Mg^{2+}$, $\frac{1}{2}$ $Ca^{2+}$, $\frac{1}{3}$ $Al^{3+}$, $NH_4^+$ and $R^aR^bR^cR^dN^+$, wherein $R^a$, $R^b$, $R^c$ and $R^d$, independently of one another, are H, linear or branched, preferably linear, $(C_1\text{-}C_{22})$-alkyl groups or linear or branched, preferably linear, $(C_2\text{-}C_{10})$-hydroxyalkyl groups, and wherein in the cations $R^aR^bR^cR^dN^+$ at least one of $R^a$, $R^b$, $R^c$ and $R^d$ is not H, and B) one or more structure units of the formula (II)

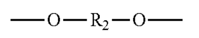 (II)

wherein $R_2$ is a linear or branched alkylene group represented by the formula $(C_mH_{2m})$ wherein m is an integer from 2 to 10, preferably from 2 to 6, and more preferably is 2, 3, 4 or 6, and C) one or more structure units selected from the group consisting of the formulae (III-a), (III-b), (III-c) and combinations thereof, (III-a)

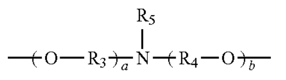

(III-b)

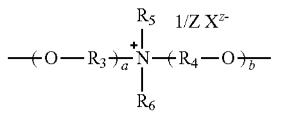

(III-c)

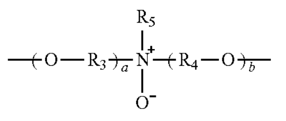

wherein $R_3$ and $R_4$ are, independently of one another, selected from linear or branched alkylene groups represented by the formula $(C_nH_{2n})$ wherein n is 2, 3 or 4, $R_5$ is a group of the formula $—(C_jH_{2j}O)_k—R_{98}$, wherein j is 2, 3 or 4, preferably 2, k is, based on a molar average, a number from 0 to 10, preferably from 0 to 5, more preferably from 0 to 2 and even more preferably is 0, and $R_{98}$ is selected from the group consisting of alkyl, alkenyl, hydroxyalkyl, hydroxyalkenyl, phenyl alkyl, phenyl alkenyl, alkyl phenyl, and alkenyl phenyl, wherein the alkyl and alkenyl groups, either as such or as a part of the aforementioned hydroxyalkyl, hydroxyalkenyl, phenyl alkyl, phenyl alkenyl, alkyl phenyl or alkenyl phenyl groups, contain 6 or more than 6 carbon atoms, preferably from 6 to 30 carbon atoms and more preferably from 6 to 22 carbon atoms, $R_6$ is a group of the formula $—(C_{j1}H_{2j1}O)_{k1}—R_{99}$, wherein j1 is 2, 3 or 4, preferably 2, k1 is, based on a molar average, a number from 0 to 10, preferably from 0 to 5, more preferably from 0 to 2 and even more preferably is 0, and $R_{99}$ is selected from the group consisting of hydrogen, alkyl, alkenyl, hydroxyalkyl, hydroxyalkenyl, phenyl alkyl, phenyl alkenyl, alkyl phenyl, and alkenyl phenyl, wherein the alkyl groups, either as such or as a part of the aforementioned hydroxyalkyl, phenyl alkyl or alkyl phenyl groups, contain from 1 to 30 carbon atoms, preferably from 1 to 22 carbon atoms and more preferably from 1 to 6 carbon atoms, and wherein the alkenyl groups, either as such or as a part of the aforementioned hydroxyalkenyl, phenyl alkenyl or alkenyl phenyl groups, contain from 2 to 30 carbon atoms, preferably from 2 to 22 carbon atoms and more preferably from 2 to 6 carbon atoms, a and b are, based on a molar average, independently of one another, numbers from 1 to 200, preferably from 1 to 100, more preferably from 1 to 50, even more preferably from 1 to 25, and particularly preferably from 1 to 10, and 1/z $X^{z-}$ is an anion, preferably selected from the group consisting of monovalent anions $X^-$ (z=1), divalent anions $\frac{1}{2}X^{2-}$ (z=2) and trivalent anions $\frac{1}{3}X^{3-}$ (z=3) and more preferably selected from the group consisting of $Cl^-$ (chloride), $Br^-$ (bromide), $CH_3—SO_4^-$ (methyl sulfate), $C_2H_5—SO_4^-$ (ethyl sulfate), $HCOO^-$ (formate), $\frac{1}{3}$ $C(OH)(COO^-)(CH_2COO^-)_2$ (citrate), $CH_3—COO^-$ (acetate), $NO_3^-$ (nitrate), $\frac{1}{2}$ $CO_3^{2-}$ (carbonate), $\frac{1}{2}$ $SO_4^{2-}$ (sulfate) and $\frac{1}{3}$ $PO_4^{3-}$ (phosphate).

The alkyl groups mentioned in the definition of the groups $R_{98}$ and $R_{99}$, either as such or as a part of the hydroxyalkyl, phenyl alkyl or alkyl phenyl groups, may be linear, branched or cyclic. Preferably, these alkyl groups are linear.

The alkenyl groups mentioned in the definition of the groups $R_{98}$ and $R_{99}$, either as such or as a part of the hydroxyalkenyl, phenyl alkenyl or alkenyl phenyl groups, may comprise one or more double bonds and may be linear, branched or cyclic. Preferably, these alkenyl groups are linear.

In some embodiments of the invention, the structure units of the formulae (III-a), (III-b), and/or (III-c) have stereoisomers, e.g. in the case when four different groups are bonded to the nitrogen atom contained in these structure units, or when the nitrogen atom in these structure units is restricted in rotation and cannot interconvert. The structure units of the formulae (III-a), (III-b), and (III-c) are intended to cover all possible stereoisomers.

The polyesters of the invention exhibit improved freshness performance and especially good anti-malodor performance. Furthermore, the polyesters of the invention can deliver multiple benefits that consumers desire, such as reducing the adhesion of soil to surfaces (soil release), reducing the adhesion of biological stains or microorganisms to textiles, and promoting the repellency of allergens from a surface. The inventive polyesters have no obvious amine smell.

The invention also provides the benefit of easy process control when synthesizing the inventive polyesters.

In EP 0 398 137 A2 rinse-added fabric conditioning compositions containing fabric softening agents and cationic soil release polymers are disclosed.

In the case that one molecule of the polyesters of the invention comprises two or more of the structure units of the formula (I), the definitions of $R_1$ and of the cation 1/p $M^{p+}$ and the binding positions of the different groups —(CO)— and $R_1$ relative to each other may vary between those structure units.

The one or more structure units of the formula (I) of the polyesters of the invention are derived from aromatic diacids or their salts or their dialkylesters, such as, terephthalic acid, phthalic acid, isophthalic acid, 5-sulfoisophthalic acid, 3-sulfophthtalic acid, 4-sulfophthtalic acid or their salts or their dialkyl esters, preferably their $(C_1-C_4)$-dialkyl esters and more preferably their dimethyl esters, or mixtures thereof. In case $R_1$ in the one or more structure units of the formula (I) is $SO_3^-$ 1/p $M^{p+}$, the cation 1/p $M^{p+}$ preferably is $Na^+$.

Preferably, $R_1$ in the one or more structure units of the formula (I) of the polyesters of the invention is H.

Preferably, in the one or more structure units of the formula (I) of the polyesters of the invention, the binding positions of the two groups —(CO)— relative to each other is "para".

More preferably, the one or more structure units (I) of the polyesters of the invention are derived from terephthalic acid or its dialkyl esters, preferably its $(C_1-C_4)$-dialkyl esters and more preferably its dimethyl esters.

Preferably, the number of structure units of the formula (I) in the inventive polyesters is, on a molar average, from 2 to 30, more preferably from 3 to 22 and even more preferably from 3 to 12.

In addition to the one or more structure units of the formula (I) further structure units derived from other di- or polycarboxylic acids or their salts or their (di)alkylesters can be used in the polyesters of the invention, such as, naphthalene-1,4-dicarboxylic acid, naphthalene-2,6,-dicarboxylic acid, tetrahydrophthalic acid, trimellitic acid, diphenoxyethane-4,4'-dicarboxylic acid, diphenyl-4,4'-dicarboxylic acid, 2,5-furandicarboxylic acid, adipic acid, sebacic acid, decan-1,10-dicarboxylic acid, fumaric acid, succinic acid, 1,4-cyclohexanedicarboxylic acid, cyclohexanediacetic acid, glutaric acid, azelaic acid, or their salts or their (di)alkyl esters, preferably their $(C_1-C_4)$-(di)alkyl esters and more preferably their (di)methyl esters, or mixtures thereof. Typically, such further structure units derived from other di- or polycarboxylic acids or their salts or their (di)alkylesters would be present to a minor extent, for example in an amount smaller than 5 wt.-%, based on the total weight of the polyester of the invention.

In the case that one molecule of the polyesters of the invention comprises two or more of the structure units of the formula (II), the definition of $R_2$ may vary between those structure units.

The one or more structure units of the formula (II) of the polyesters of the invention are preferably derived from glycols, and more preferably from ethyleneglycol, 1,2-propyleneglycol, 1,3-propyleneglycol, 2-methyl-1,3-propanediol, 1,4-butanediol, 1,3-butanediol, 2,3-butanediol, 1,2-butanediol, 2,2-dimethyl-1,3-propanediol, 1,2-pentanediol, 1,5-pentanediol, 1,2-hexanediol, 1,6-hexanediol or mixtures thereof.

Even more preferably, $R_2$ in the one or more structure units of the formula (II) of the polyesters of the invention is selected from the group consisting of $(C_2H_4)$, $(C_3H_6)$ and mixtures thereof, and particularly preferably is $(C_3H_6)$.

In the case that one molecule of the polyesters of the invention comprises two or more of the structure units of the formula (III-a) and/or two or more of the structure units of the formula (III-b) and/or two or more of the structure units of the formula (III-c), the definitions of $R_3$, $R_4$, $R_5$, $R_6$, a, b and 1/z $X^{z-}$ may vary between those structure units.

The one or more structure units of the formula (III-a) of the polyesters of the invention, the one or more structure units of the formula (III-b) of the polyesters of the invention and the one or more structure units of the formula (III-c) of the polyesters of the invention are preferably derived from amine alkoxylates.

Preferably, $R_3$ and $R_4$ in the one or more structure units of the formula (III-a) of the polyesters of the invention and/or in the one or more structure units of the formula (III-b) of the polyesters of the invention and/or in the one or more structure units of the formula (III-c) of the polyesters of the invention are $(C_2H_4)$.

In a preferred embodiment of the invention, a and b in the one or more structure units of the formula (III-a) of the polyesters of the invention and/or in the one or more structure units of the formula (III-b) of the polyesters of the invention and/or in the one or more structure units of the formula (III-c) of the polyesters of the invention are 1.

Examples of the alkyl and alkenyl groups $R_{98}$ in the one or more structure units of the formula (III-a) and/or the one or more structure units of the formula (III-b) and/or the one or more structure units of the formula (III-c) are, for example, linear, branched or cyclic hexyl, heptyl, octyl (e.g. capryl), nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetraicosyl, pentaicosyl, hexaicosyl, heptaicosyl, octaicosyl, nonaicosyl, triacontyl, hexenyl, heptenyl, octenyl, nonenyl, decenyl, dodecenyl, tetradecenyl, hexadecenyl, octadecenyl, octadecadienyl, octadecatrienyl, eicosenyl, eicosadienyl, eicosatetraenyl, docosenyl, docosahexaenyl, tetracosenyl, or mixtures thereof.

Examples of the hydroxy alkyl and hydroxy alkenyl groups $R_{98}$ in the one or more structure units of the formula (III-a) and/or the one or more structure units of the formula (III-b) and/or the one or more structure units of the formula (III-c) are, for example, hydroxy hexyl, hydroxy heptyl, hydroxy octyl, hydroxy nonyl, hydroxy decyl, hydroxy undecyl, hydroxy dodecyl, hydroxy docosyl, hydroxy hexenyl, hydroxy heptenyl, hydroxy octenyl, hydroxy nonenyl, hydroxy decenyl, hydroxy dodecenyl, hydroxy docosenyl, or mixtures thereof.

"Phenyl alkyl" (or "phenyl alkylene") or "phenyl alkenyle" (or "phenyl alkenylene") groups according to the present invention are groups that are bound via their respective alkyl (or alkylene) or alkenyl (or alkenylene) group to the rest of the molecule. In contrast thereto, "alkyl phenyl" (or "alkyl phenylene") or "alkenyl phenyl" (or "alkenyl phenylene") groups according to the present invention are groups that contain an alkyl or an alkenyl group but are bound via their respective phenyl (or phenylene) group to the rest of the molecule.

Examples of the phenyl alkyl and phenyl alkenyl groups $R_{98}$ in the one or more structure units of the formula (III-a) and/or the one or more structure units of the formula (III-b) and/or the one or more structure units of the formula (III-c) are, for example, phenyl hexyl, phenyl heptyl, phenyl octyl, phenyl nonyl, phenyl decyl, phenyl undecyl, phenyl dodecyl, phenyl hexenyl, phenyl heptenyl, phenyl octenyl, phenyl nonenyl, phenyl decenyl, phenyl dodecenyl, or mixtures thereof.

Examples of the alkyl phenyl and alkenyl phenyl groups $R_{98}$ in the one or more structure units of the formula (III-a) and/or the one or more structure units of the formula (III-b) and/or the one or more structure units of the formula (III-c) are, for example, hexyl phenyl, heptyl phenyl, octyl phenyl, nonyl phenyl, decyl phenyl, undecyl phenyl, dodecyl phenyl, hexenyl phenyl, heptenyl phenyl, octenyl phenyl, nonenyl phenyl, decenyl phenyl, dodecenyl phenyl, or mixtures thereof.

In one preferred embodiment of the invention the group $R_{98}$ in the one or more structure units of the formula (III-a) and/or the one or more structure units of the formula (III-b) and/or the one or more structure units of the formula (III-c) of the inventive polyesters is cyclohexyl. In this preferred embodiment of the invention, the variable "k" preferably is 0.

In another preferred embodiment of the invention the group $R_{98}$ in the one or more structure units of the formula (III-a) and/or the one or more structure units of the formula (III-b) and/or the one or more structure units of the formula (III-c) of the inventive polyesters is n-octyl (capryl). In this preferred embodiment of the invention, the variable "k" preferably is 0.

In another preferred embodiment of the invention at least 10 wt.-%, more preferably at least 30 wt.-% and even more preferably at least 50 wt.-% of the groups $R_{98}$ in the one or more structure units of the formula (III-a) and/or the one or more structure units of the formula (III-b) and/or the one or more structure units of the formula (III-c) of the inventive polyesters, preferably in case $R_{98}$ is selected from the group consisting of alkyl, alkenyl, hydroxyalkyl and hydroxyalkenyl and more preferably in case $R_{98}$ is selected from the group consisting of alkyl and alkenyl, contain 8 or more than 8 carbon atoms, preferably 10 or more than 10 carbon atoms and more preferably 12 or more than 12 carbon atoms, in each case based on the total weight of the groups $R_{98}$ in the inventive polyesters. In this preferred embodiment of the invention, the variable "k" preferably is 0.

In a more preferred embodiment of the invention the group $R_{98}$ in the one or more structure units of the formula (III-a) and/or the one or more structure units of the formula (III-b) and/or the one or more structure units of the formula (III-c) of the inventive polyesters is cocoyl. In this preferred embodiment of the invention, the variable "k" preferably is 0.

Preferably, $R_{98}$ in the one or more structure units of the formula (III-a) of the polyesters of the invention and/or in the one or more structure units of the formula (III-b) of the polyesters of the invention and/or in the one or more structure units of the formula (III-c) of the polyesters of the invention is selected from the group consisting of alkyl, alkenyl and mixtures thereof and wherein the alkenyl groups comprise one or more double bonds, more preferably from the group consisting of linear alkyl, cycloalkyl and linear alkenyl, and mixtures thereof and wherein the linear alkenyl groups comprise one or more double bonds, and even more preferably from the group consisting of linear alkyl and linear alkenyl, and mixtures thereof and wherein the linear alkenyl groups comprise one or more double bonds.

In these preferred embodiments of the invention, the variable "k" preferably is 0 and furthermore, in these preferred embodiments of the invention, the alkyl groups and/or alkenyl groups preferably contain from 6 to 22 carbon atoms.

Examples of the alkyl and alkenyl groups $R_{99}$ in the one or more structure units of the formula (III-b) are, for example, methyl, ethyl, linear, branched or cyclic propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetraicosyl, pentaicosyl, hexaicosyl, heptaicosyl, octaicosyl, nonaicosyl, triacontyl, ethenyl or vinyl, propenyl, butenyl, pentenyl, hexenyl, heptenyl, octenyl, nonenyl, decenyl, dodecenyl, tetradecenyl, hexadecenyl, octadecenyl, octadecadienyl, octadecatrienyl, eicosenyl, eicosadienyl, eicosatetraenyl, docosenyl, docosahexaenyl, tetracosenyl, or mixtures thereof.

Examples of the hydroxy alkyl and hydroxy alkenyl groups $R_{99}$ in the one or more structure units of the formula (III-b) are, for example, hydroxy methyl, hydroxy ethyl, hydroxy propyl, hydroxy butyl, hydroxy pentyl, hydroxy hexyl, hydroxy ethenyl, hydroxy propenyl, hydroxy butenyl, hydroxy pentenyl, hydroxy hexenyl or mixtures thereof.

Examples of the phenyl alkyl or phenyl alkenyl groups $R_{99}$ in the one or more structure units of the formula (III-b) are, for example, phenyl methyl (or benzyl), phenyl ethyl, phenyl propyl, phenyl butyl, phenyl pentyl, phenyl hexyl, phenyl ethenyl, phenyl propenyl, phenyl butenyl, phenyl pentenyl, phenyl hexenyl or mixtures thereof.

Examples of the alkyl phenyl or alkenyl phenyl groups $R_{99}$ in the one or more structure units of the formula (III-b) are, for example, methyl phenyl, ethyl phenyl, propyl phenyl, butyl phenyl, pentyl phenyl, hexyl phenyl, ethenyl phenyl, propenyl phenyl, butenyl phenyl, pentenyl phenyl, hexenyl phenyl or mixtures thereof.

Preferably, $R_{99}$ in the one or more structure units of the formula (III-b) of the polyesters of the invention is a linear or branched, preferably a linear, alkyl group, more preferably containing from 1 to 4 carbon atoms and even more preferably is methyl. In these preferred embodiments of the invention, the variable "k1" preferably is 0.

Preferably, the polyesters of the invention further comprise one or more terminal groups (IV) derived from polyalkyleneglycol monoalkylethers, preferably selected from the formula (IV-a)

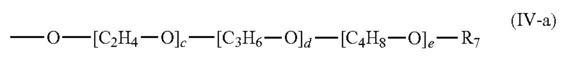

(IV-a)

wherein $R_7$ is linear or branched $(C_1\text{-}C_{30})$-alkyl, preferably linear or branched $(C_1\text{-}C_4)$-alkyl, and more preferably methyl, c, d and e are, based on a molar average, independently of one another, numbers from 0 to 200, the sum of c+d+e is from 2 to 500, the $[C_2H_4—O]$, $[C_3H_6—O]$ and $[C_4H_8—O]$ groups of the terminal group (IV-a) may be arranged blockwise, alternating, periodically and/or statistically, preferably blockwise and/or statistically, and either of the $[C_2H_4—O]$, $[C_3H_6—O]$ and $[C_4H_8—O]$ groups of the terminal group (IV-a) can be linked to $—R_7$ and/or —O.

In the case that one molecule of the polyesters of the invention comprises two or more of the terminal groups (IV-a) the definition of $R_7$, c, d and e may vary between those terminal groups.

In the case that at least two of c, d and e of the terminal group (IV-a) adopt non-zero values, the $[C_4H_8—O]—$, $[C_3H_6—O]—$ and $[C_2H_4—O]$-groups may be arranged blockwise, alternating, periodically and/or statistically, preferably blockwise and/or statistically. This means that in the terminal group (IV-a), the groups $[C_4H_8—O]$, $[C_3H_6—O]$ and $[C_2H_4—O]$ may be arranged, for example, in a purely statistically or blockwise form but may also be arranged in a form which could be considered as both statistical and blockwise, e.g. small blocks of $[C_3H_6—O]$ and $[C_2H_4—O]$ arranged in a statistical manner, or in a form wherein adjacent instances of statistical and blockwise arrangements of the groups $[C_4H_8—O]$, $[C_3H_6—O]$ and $[C_2H_4—O]$ exist.

Any of the groups $[C_4H_8—O]$, $[C_3H_6—O]$ and $[C_2H_4—O]$ can be linked to $R_7—$ and —O. This means, for example, that both $R_7—$ and —O may be connected to a $[C_4H_8—O]$-group, they may both be connected to a $[C_3H_6—O]$-group, they may both be connected to a $[C_2H_4—O]$-group or they may be connected to different groups selected from $[C_4H_8—O]$, $[C_3H_6—O]$ and $[C_2H_4—O]$.

Preferably, "c" in formula (IV-a) is, based on a molar average, a number from 0 to 180, more preferably from 2 to 130 and even more preferably from 10 to 130.

Preferably, "d" in formula (IV-a) is, based on a molar average, a number from 0 to 50, more preferably from 0 to 20 and even more preferably "d" is 0.

Preferably, "e" in formula (IV-a) is 0.

More preferably, "d" and "e" in formula (IV-a) are 0.

In a preferred embodiment of the invention the polyester further comprises one or more polyalkyleneglycol-derived structure units (V), preferably selected from the formula (V-a)

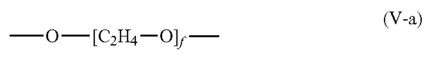

(V-a)

wherein f is, based on a molar average, a number from 2 to 500, preferably from 2 to 200, more preferably from 2 to 130 and even more preferably from 10 to 130.

In the one or more polyesters of the invention, the combined amount of the one or more structure units of the formula (I), and the one or more structure units of the formula (11), and the one or more structure units selected from the group consisting of the formulae (IIIa), (III-b), (III-c) and combinations thereof, and furthermore, if present, the one or more terminal groups (IV) derived from polyalkyleneglycol monoalkylethers, preferably selected from the formula (IV-a), and, if present, the one or more polyalkyleneglycol-derived structure units (V), preferably selected from the formula (V-a), preferably is at least 50 wt.-%, more preferably at least 60 wt.-%, even more preferably at least 70 wt.-% and particularly preferably at least 80 wt.-%, in each case based on the total weight of the polyester.

In a preferred embodiment of the invention the inventive polyesters consist exclusively of one or more structure units of the formula (I), and of one or more structure units of the formula (II), and of one or more structure units selected from the group consisting of the formulae (IIIa), (IIIb), (III-c) and combinations thereof, and furthermore, if present, of one or more terminal groups (IV) derived from polyalkyleneglycol monoalkylethers, preferably selected from the formula (IV-a), and, if present, of one or more polyalkyleneglycol-derived structure units (V), preferably selected from the formula (V-a).

In a more preferred embodiment of the invention the inventive polyesters consist exclusively of one or more structure units of the formula (I), and of one or more structure units of the formula (II), and of one or more structure units selected from the group consisting of the formulae (IIIa), (IIIb), (III-c) and combinations thereof, and one or more terminal groups (IV) derived from polyalkyleneglycol monoalkylethers, preferably selected from the formula (IV-a).

The amount of the one or more terminal groups (IV), based on the total weight of the inventive polyester, is preferably at least 40 wt.-%, more preferably at least 50 wt.-%, even more preferably at least 60 wt.-% and particularly preferably at least 70 wt.-%.

Preferably, the weight average molecular weight (Mw) of the inventive polyesters is from 2000 to 20000 g/mol. The weight average molecular weight (Mw) of the inventive polyesters may be determined by GPC analysis, preferably as detailed in the following: 10 µl of sample is injected onto a PSS Suprema column of dimensions 300×8 mm with porosity 30 Å and particle size 10 µm. The detection is monitored at 235 nm on a multiple wavelength detector. The employed eluent is 1.25 g/l of disodium hydrogen phosphate in a 45/55% (v/v) water/acetonitrile mixture. Separations are conducted at a flow-rate of 0.8 ml/minute. Quantification is performed by externally calibrating standard samples of different molecular weight polyethylene glycols.

A further subject matter of the invention is inventive "polyesters A" obtainable by reacting the following components:

1.) one or more substances of the formula $Q_1$-OOC—$C_6H_3R_1$—COO-$Q_2$, wherein $Q_1$ and $Q_2$, independently of one another, are selected from the group consisting of H and $(C_1-C_4)$-alkyl and preferably are $CH_3$ and $R_1$ has the meaning given above, and preferably is H, and
2.) one or more glycols of the formula HO—$R_2$—OH, wherein $R_2$ has the meaning given above, and
3.) one or more amine alkoxylates of the formula $H—(O—R_3)_a—N(R_5)—(R_4—O)_b—H$, wherein $R_3$, $R_4$, $R_5$, a and b have the meaning given above,
4.) and optionally one or more polyalkyleneglycol monoalkylethers and preferably one or more polyalkyleneglycol monoalkylethers of the formula $HO—[C_2H_4—O]_c—[C_3H_6—O]_d—[C_4H_8—O]_e—R_7$, wherein c, d, e and $R_7$ have the meaning given above,
5.) and optionally one or more polyalkyleneglycols and preferably one or more polyalkyleneglycols of the formula $HO—[C_2H_4—O]_f—OH$, wherein f has the meaning given above,
6.) and optionally subsequently either quaternising the polyesters obtained, preferably with quaternising agents such as dimethylsulfate, or oxidizing the polyesters obtained, preferably with oxidising agents such as hydrogen peroxide $H_2O_2$.

The preferred meanings for the components to be reacted for obtaining inventive polyesters A can be derived from the preferred respective structure units described above for the polyesters of the invention, such as the preferred meanings for $R_1$, $R_2$, $R_3$, $R_4$, $R_5$, a, b, c, d, e, $R_7$ and f.

Inventive polyesters A obtainable by reacting components 1.), 2.), 3.) and 4.) and optionally subsequently either quaternising the polyesters obtained or oxidizing the polyesters obtained are preferred.

Inventive polyesters A are preferably obtainable using the inventive process described below.

For the preparation of the polyesters of the invention, typically a two-stage process is used of either direct esterification of diacids and diols or transesterification of diesters and diols, followed by a polycondensation reaction under reduced pressure.

A further subject matter of the invention is a process for the preparation of the inventive polyesters, comprising the steps of: heating one or more substances of the formula $Q_1$-OOC—$C_6H_3R_1$—COO-$Q_2$, wherein $Q_1$ and $Q_2$, independently of one another, are selected from the group consisting of H and ($C_1$-$C_4$)-alkyl and preferably are $CH_3$ and $R_1$ has the meaning given above, and preferably is H, and one or more glycols of the formula HO—$R_2$—OH, wherein $R_2$ has the meaning given above, and one or more amine alkoxylates of the formula H—(O—$R_3$)$_a$—N($R_5$)—($R_4$—O)$_b$—H, wherein $R_3$, $R_4$, $R_5$, a and b have the meaning given above, with the addition of a catalyst, to temperatures of 160 to 220° C., preferably beginning at atmospheric pressure, and then continuing the reaction under reduced pressure at temperatures of from 160 to 240° C. Reduced pressure preferably means a pressure of from 0.1 to 900 mbar and more preferably a pressure of from 0.5 to 500 mbar.

Typical transesterification and condensation catalysts known in the art can be used for the inventive process for the preparation of the inventive polyesters, such as antimony, germanium and titanium-based catalysts. Preferably, tetraisopropyl orthotitanate (IPT) and sodium acetate (NaOAc) are used as the catalyst system in the inventive process for the preparation of the polyesters of the invention.

The aforementioned process of the invention using one or more amine alkoxylates of the formula H—(O—$R_3$)$_a$—N(R)—($R_4$—O)$_b$—H result in polyesters of the invention that comprise one or more structure units (III-a).

These polyesters can e.g. be quaternised by methods well-known to the person skilled in the art in order to obtain the polyesters of the invention that comprise one or more structure units (III-b), for example with quaternising agents such as dimethylsulfate, or they can be oxidised by methods well-known to the person skilled in the art in order to obtain the polyesters of the invention that comprise one or more structure units (III-c), for example with oxidising agents such as hydrogen peroxide $H_2O_2$.

In order to obtain polyesters of the invention comprising one or more terminal groups (IV) derived from one or more polyalkyleneglycol monoalkylethers and preferably one or more terminal groups selected from the formula —O—[$C_2H_4$—O]$_c$—[$C_3H_6$—O]$_d$—[$C_4H_8$—O]$_e$—$R_7$ (IV-a), the respective one or more polyalkyleneglycol monoalkylethers and preferably the respective one or more polyalkyleneglycol monoalkylethers of the formula HO—[$C_2H_4$—O]$_c$—[$C_3H_6$—O]$_d$—[$C_4H_8$—O]$_e$—$R_7$, wherein c, d, e and $R_7$ have the meaning given above, may be employed in the inventive process for the preparation of the polyesters of the invention.

In order to obtain polyesters of the invention comprising one or more polyalkyleneglycol-derived structure units (V) and preferably selected from the formula —O—[$C_2H_4$—O]$_f$— (V-a), the respective one or more polyalkyleneglycols and preferably the respective one or more polyalkyleneglycols of the formula HO—[$C_2H_4$—O]$_f$—OH, wherein f has the meaning given above, may be employed in the inventive process for the preparation of the polyesters of the invention.

The polyesters of the invention may be used in substance, i.e. as granules, but may also be provided as solutions or dispersions. The latter two exhibit beneficial handling properties and are more easily dosed. Preferably, the solutions or dispersions comprise the polyesters of the invention in an amount of from 25 to 70 weight-% based on the total weight of the solution or dispersion. Suitable solvents for such solutions or dispersions are for example: water, ethanol, propanol, butanol, ethylene glycol, 1,2-propylene glycol, 1,3-propylene glycol, 1,2-butylene glycol, 1,3 butylene glycol, 1,4-butylene glycol, butyl glycol, butyl diglycol and butyl polyglycol. These solvents are preferably used in an amount of from 25 to 75 wt.-% and more preferably in an amount of from 30 to 75 wt.-%, in each case based on the total weight of the solution or dispersion.

A further subject matter of the invention is solutions or dispersions comprising one or more polyesters of the invention, preferably in an amount of from 25 to 70 wt.-%, based on the total weight of the solution or dispersion, and one or more solvents selected from the group consisting of water, ethanol, propanol, butanol, ethylene glycol, 1,2-propylene glycol, 1,3-propylene glycol, 1,2-butylene glycol, 1,3 butylene glycol, 1,4-butylene glycol, butyl glycol, butyl diglycol and butyl polyglycol, preferably in an amount of from 25 to 75 wt.-% and more preferably in an amount of from 30 to 75 wt.-%, in each case based on the total weight of the solution or dispersion.

The groups ($C_2H_4$) in the structural units (II), (III-a), (III-b), (III-c), (IV-a) or (V-a) (or in groups $R_5$ and $R_6$) preferably are of the formula —$CH_2$—$CH_2$—.

The groups ($C_3H_6$) in the structural units (II), (III-a), (III-b), (III-c) or (IV-a) (or in groups $R_5$ and $R_6$) preferably are of the formula —CH($CH_3$)—$CH_2$— or —$CH_2$—CH($CH_3$)—, i.e. of the formula:

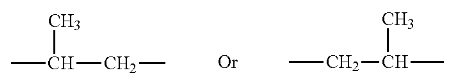

The groups ($C_4H_8$) in the structural units (II), (III-a), (III-b), (III-c) or (IV-a) (or in groups $R_5$ and $R_6$) are preferably of the formula —CH($CH_3$)—CH($CH_3$)—, i.e. of the formula:

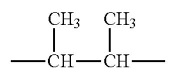

In the polyesters of the invention, the structure units of the formulae (II), (III-a), (III-b), (III-c), (IV-a) or (V-a) may be linked directly to structure units of the formula (I). Ester groups result. However, in the polyesters of the invention, the structure units of the formulae (II), (III-a), (III-b), (III-c), (IV-a) or (V-a) may not be linked directly to one or more other structure units of the formulae (II), (III-a), (III-b), (III-c), (IV-a) or (V-a).

It is to be understood that the polyesters of the invention are typically prepared by polycondensation processes. This leads to statistically determined mixtures of polyesters in which a mixture of molecular species with a distribution around a molar average is obtained.

The following paragraphs will show illustrative, but by no means limiting, structural entities that can be found in the polyesters of the invention.

The structure units of the formula (I) and optional additional di- or polycarboxylic acid-based structures are linked indirectly, preferably via the structure units of the formulae (II), (IIIa), (IIIb) or (IIIc), which—in the case of structure units of the formulae (I) and (II) or in the case of the structure units of the formulae (I) and (IIIa)—results in the following structural entities:

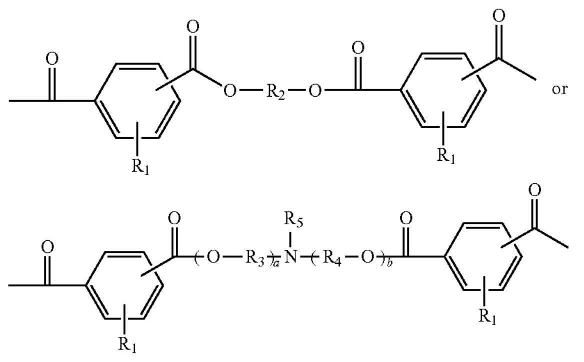

Preferably, the terminal group (IV) is linked to an acyl group derived from a dicarboxylic acid, preferably to the structure unit of the formula (I), which—in the case of structure unit of the formula (IV-a)—results in the following structural entity:

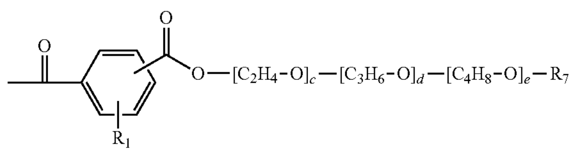

EXAMPLES

The examples below are intended to illustrate the invention in detail without, however, limiting it thereto. Unless explicitly stated otherwise, all percentages given are percentages by weight (% by wt. or wt.-%).

Example 1: Polyester Preparation

General procedure for the preparation of the polyesters of the examples. The polyester synthesis is carried out by the reaction of dimethyl terephthalate (DMT), one or more alkylene glycols, one or more amine ethoxylates and one or more alkyl capped polyalkylene glycols, using sodium acetate (NaOAc) and tetraisopropyl orthotitanate (IPT) as the catalyst system. The synthesis is a two-step procedure. The first step is a trans-esterification and the second step is a polycondensation. Subsequently, the obtained polyester can be quaternised or N-oxidised.

Key to reactants used in the examples:

AES is alcohol ethoxysulfate

DMT is dimethyl terephthalate

EO is $—CH_2CH_2O—$ or $—OCH_2CH_2—$

Genamin® C 020 is coconut fatty amine ethoxylate with 2 EO (Clariant)

Genamin® C 050 is coconut fatty amine ethoxylate with 5 EO (Clariant)

Genamin® C 100 is coconut fatty amine ethoxylate with 10 EO (Clariant)

Genamin® C 200 is coconut fatty amine ethoxylate with 20 EO (Clariant)

Genamin® CH 020 is cyclohexylamine ethoxylate with 2 EO (Clariant)

Genamin® 3920 is caprylamine ethoxylate with 2-4 EO (Clariant)

IPT is tetraisopropyl orthotitanate

LAS is linear alkyl benzene sulphonate

MEA is monoethanolamine mPEG750 is mono hydroxyl-functional polyethylene glycol monomethyl ether, average molecular weight 750 Da (Polyglykol M 750, Clariant)

mPEG1000 is mono hydroxyl-functional polyethylene glycol monomethyl ether, average molecular weight 1 kDa (Polyglykol M 1000, Clariant)

mPEG2000 is mono hydroxyl-functional polyethylene glycol monomethyl ether, average molecular weight 2 kDa (Polyglykol M 2000, Clariant)

mPEG3000 is mono hydroxyl-functional polyethylene glycol monomethyl ether, average molecular weight 3 kDa (Polyglykol M 3000, Clariant)

mPEG4000 is mono hydroxyl-functional polyethylene glycol monomethyl ether, average molecular weight 4 kDa (Polyglykol M 4000, Clariant)

mPEG5000 is mono hydroxyl-functional polyethylene glycol monomethyl ether, average molecular weight 5 kDa (Polyglykol M 5000, Clariant)

NaCS is sodium cumene sulfonate

Na-DTPA is sodium salt of diethylenetriamine-pentaacetate

NaOAc is sodium acetate

NBDEA is N-butyldiethanolamine

NI 7EO is nonionic surfactant alkyl alkoxylate with on average 7 EO

NI 9EO is nonionic surfactant alkyl alkoxylate with on average 9 EO

NMDEA is N-methyldiethanolamine

PG is 1,2-propylene glycol

Texcare® SRN 240 is a nonionic soil release polymer (Clariant)

Texcare® SRN 260 is a nonionic soil release polymer (Clariant)

Tinosan HP100 is 30 wt.-% 4.4'-dichloro 2-hydroxydiphenyl ether dissolved in 1,2-propylene glycol TSA is Tryptic Soy agar, purchased from Merck

Inventive Polyester Example 1

194 g (1 mol) of Dimethyl terephthalate (DMT), 143 g (1.88 mol) of 1,2-propylene glycol (PG), 71.2 g (0.25 mol) of Genamin® C 020, 456 g (0.23 mol) of mPEG2000 and 1.25 g of sodium acetate (anhydrous) (NaOAc) are weighed into a reaction vessel at room temperature. For the melting process and homogenization, the mixture is heated up to 70° C. 1.65 mmol of tetraisopropyl orthotitanate (IPT) is added and the mixture is further heated up to 170° C. for 1 hour and then up to 210° C. for a further 1 hour sparged by a nitrogen stream. During the transesterification methanol is released from the reaction and is distilled out of the system (distillation temperature <55° C.). After 2 hours at 210° C. nitrogen is switched off and the pressure is reduced to 400 mbar over 3 hours. Subsequently, the mixture is heated up to 230° C. At 230° C., the pressure is reduced to 1 mbar over 160 minutes. Once the polycondensation reaction has started, 1,2-propylene glycol is distilled out of the system. The mixture is stirred for 4 hours at 230° C. and a pressure of 1 mbar. The reaction mixture is cooled down to 140-150° C. Vacuum is released with nitrogen and the molten polyester is transferred out of the reactor.

Inventive Polyester Example 2

103.47 g of polyester example 1 was suspended in 126.1 mL of water at 60° C. To this suspension 10.4 µL (0.0146 mmol) diethylenetriaminepentaacetic acid (DTPA) and 0.2214 g $NaHCO_3$ (2.6 mmol) were added. Now, 2.52 mL (29.3 mmol, 1.0 eq., based on the amine number of the polyester) $H_2O_2$ was added dropwise over a period of 30 minutes. The reaction mixture was stirred for 6 hours at 60° C. Based on NMR-analysis additional 2.52 mL $H_2O_2$ were added dropwise and the reaction mixture was stirred for additional 7 hours at 80° C. After the addition of 0.2232 g $NaHCO_3$ (2.6 mmol) and further 4 hours at 80° C. the reaction mixture was cooled down and transferred out of the vessel.

Inventive Polyester Example 3

100.64 g of polyester example 1 was heated to 60° C. and 2.65 mL (0.028 mol, 0.98 eq. based on the amine number of the polyester) dimethylsulphate was added dropwise over a period of 10 minutes. The reaction mixture was heated to 80° C. and stirred for additional 6 hours. During this period 11.57 g of isopropanol was added to keep the reaction mixture stirrable. After a negative Preussmanntest the reaction mixture was cooled down and the quaternised polyester was transferred out of the vessel.

Inventive polyester examples 4 to 17 are synthesized according to the general procedure as described above for inventive polyester example 1 with monomer type and dosage described below (see Table 1-1).

TABLE 1-1

Inventive polyester examples 4 to 17

| Inventive polyester example | DMT [g] | mPEG [molecular weight] | mPEG [g] | PG [g] | amine ethoxylate Type | amine ethoxylate [g] | IPT [µL] | NaOAc [g] |
|---|---|---|---|---|---|---|---|---|
| 4 | 97 | 2000 | 250 | 62 | Genamin ® 3920 | 19 | 200 | 0.50 |
| 5 | 97 | 2000 | 250 | 55 | Genamin ® 3920 | 38 | 200 | 0.50 |
| 6 | 97 | 2000 | 250 | 62 | Genamin ® CH 020 | 19 | 200 | 0.50 |
| 7 | 31 | 2000 | 72 | 23 | Genamin ® C 020 | 5 | 75 | 0.19 |
| 8 | 28 | 2000 | 65 | 20 | Genamin ® C 020 | 16 | 75 | 0.19 |
| 9 | 78 | 2000 | 182 | 53 | Genamin ® C 020 | 60 | 200 | 0.50 |
| 10 | 28 | 2000 | 66 | 21 | Genamin ® C 050 | 15 | 75 | 0.19 |
| 11 | 27 | 2000 | 62 | 19 | Genamin ® C 100 | 22 | 75 | 0.19 |
| 12 | 24 | 2000 | 56 | 17 | Genamin ® C 200 | 33 | 75 | 0.19 |
| 13 | 30 | 750 | 67 | 22 | Genamin ® C 020 | 11 | 75 | 0.19 |
| 14 | 30 | 1000 | 68 | 22 | Genamin ® C 020 | 11 | 75 | 0.19 |
| 15 | 29 | 3000 | 69 | 21 | Genamin ® C 020 | 11 | 75 | 0.19 |
| 16 | 29 | 4000 | 69 | 21 | Genamin ® C 020 | 11 | 75 | 0.19 |
| 17 | 29 | 5000 | 69 | 21 | Genamin ® C 020 | 11 | 75 | 0.19 |

Comparative polyester examples 1 to 4 are synthesized according to the general procedure as described above for inventive polyester example 1 with monomer type and dosage described below (see Table 1-2).

TABLE 1-2

Comparative polyester examples 1 to 4

| Comparative polyester | DMT [g] | mPEG [molecular weight] | mPEG [g] | PG [g] | amine ethoxylate Type | amine ethoxylate [g] | IPT [µL] | NaOAc [g] |
|---|---|---|---|---|---|---|---|---|
| 1 | 31 | 2000 | 73 | 21 | NMDEA | 10 | 75 | 0.19 |
| 2 | 31 | 2000 | 73 | 21 | NBDEA | 13 | 75 | 0.19 |
| 3 | 31 | 2000 | 73 | 23 | NMDEA | 5 | 75 | 0.19 |
| 4 | 31 | 2000 | 73 | 23 | NBDEA | 7 | 75 | 0.19 |

Example 2: Polyester Structure and Smell

The structure of the inventive and comparative polyesters of Table 2 below can be described using the following formula.

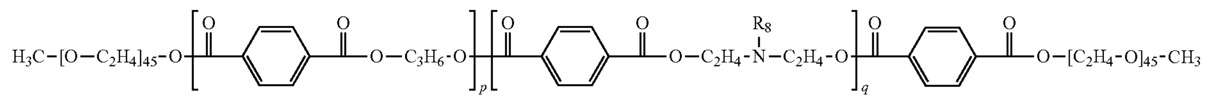

The values of p and q mentioned in Table 2 below are obtained by NMR measurements.

TABLE 2

| Polyester structures and odour | | | | |
|---|---|---|---|---|
| | $R_5$ | p | q | Polyester odour |
| Comparative polyester 1 | methyl | 5.9 | 1.5 | Strong amine smell |
| Comparative polyester 2 | n-butyl | 4.3 | 3.2 | amine smell |
| Comparative polyester 3 | methyl | 7.0 | 0.6 | Strong amine smell |
| Comparative polyester 4 | n-butyl | 6.2 | 1.5 | amine smell |
| Inventive polyester 9 | cocoyl | 3.5 | 4.0 | No obvious amine smell |
| Inventive polyester 1 | cocoyl | 5.1 | 2.1 | No obvious amine smell |
| Inventive polyester 4 | n-octyl | 5.8 | 1.0 | No obvious amine smell |
| Inventive polyester 6 | cyclohexyl | 5.6 | 1.3 | No obvious amine smell |

It was found that inventive polyesters have no obvious amine smell, which makes them suitable for use in detergent compositions as malodor control polyesters. The comparative polyesters are not suitable for use as malodor control polyesters because of their amine smell.

Example 3: Method of Evaluating Malodor and Freshness Benefit

Malodor and freshness of compositions comprising inventive or comparative polyesters are evaluated using the method described below.

Step 1: 'Strip' Wash

The desired range of fabrics for test are sourced from commercial suppliers. On receipt they are 'strip' washed twice to remove finishes applied by the garment/fabric manufacturer. Typically, a detergent which does not contain inventive polyester is used. Example detergent compositions not containing inventive polyester are composition A, composition B and composition C.

Step 2: Pre-Conditioning

After 'strip' washed, the test fabrics are preconditioned for additional 4 cycles using composition comprising inventive polyester and composition not comprising inventive polyester. If the weight of the test fabric is lower than the standard load size of the washing machine, additional ballast may be added into the washing machine and washed together with the test fabrics.

Step 3: Malodour Development

After pre-conditioning, standard size swatches (17.8 cm×17.8 cm) are cut from the preconditioned fabrics, and labelled, to provide 2 repetitions. The fabric swatches are then washed together with a series of malodour generation fabrics, including around 2.2 kg consumer dirty garment (sourced from consumer), 4 pieces WfK SBL 2004 sheets (sourced from Center for Testmaterials B.V.), 2 pieces 45 cm×45 cm CFT PC-S-33 Sebum/Carbon Black (sourced from Center for Testmaterials B.V.) sheets, 6 ml Technical (Artificial) Body Soil (sourced from Lubrizol) applied on 10 cm×5 cm polycotton fabric. If the weight of the test fabric and malodour generation fabric is lower than the standard load size of the washing machine, additional ballast may be added into the washing machine and washed together with the test fabrics. The test swatches are then left to allow malodour to develop after wash for further panellist assessment.

The fabric swatches with different pre-conditioning are washed all together in a single washing machine, using a detergent which does not contain inventive polyester or other soil release polyester. After wash, the swatches are left overnight in the washing machine, then removed from the washing machine into individual glass jars and stored for additional 3 days before panellist assessment.

Step 4: Malodour and Freshness Assessment.

The fabric swatches after malodour development are evaluated via a panel of 3 expert human graders, who grade each swatch for malodour intensity on a Monadic scale. The following 0-10 scales are used for malodour assessment (see Table 3-1). Malodour difference versus reference is usually reported. The malodour results given in the tables below are calculated as follows: malodour value of the reference minus malodour value of the sample.

TABLE 3-1

| Scales used for malodour assessment | |
|---|---|
| Scale | Description |
| 0 | No malodor |
| 2 | I think there is malodor |
| 4 | There is definitely malodor |
| 6 | Strong malodor |
| 8 | Very strong malodor |
| 10 | Eye-watery strong malodor |

The freshness is evaluated against a reference using the following scales (see Table 3-2). The freshness results given in the tables below are calculated as follows: freshness value of the sample minus freshness value of the reference.

TABLE 3-2

| Scales used for freshness evaluation | |
|---|---|
| Scale | Description |
| 0 | No difference in freshness |
| +2.5 | Slightly more freshness |
| +5 | Clearly more freshness |
| +7.5 | Very clearly more freshness |

Example 4. Malodor Benefit

Malodor Benefit of Inventive Polyester Versus No Polyester:

Liquid detergent composition containing inventive polyester example 1 (composition 1), 2 (composition 2), 3 (composition 3) and liquid detergent composition A comprising no inventive polyester are prepared by means known to those of ordinary skill in the art by mixing the listed ingredients (see Table 4-1).

TABLE 4-1

Compositions 1, 2 and 3 comprising inventive polyester and composition A comprising no inventive polyester

| | Composition 1 [wt.-%] | Composition 2 [wt.-%] | Composition 3 [wt.-%] | Composition A [wt.-%] |
|---|---|---|---|---|
| LAS | 13.4 | 13.4 | 13.4 | 13.4 |
| AES | 9.7 | 9.7 | 9.7 | 9.7 |
| NI 7EO | 6.4 | 6.4 | 6.4 | 6.4 |
| Fatty Acid | 3.0 | 3.0 | 3.0 | 3.0 |
| Citric Acid | 3.7 | 3.7 | 3.7 | 3.7 |
| PEG-PVAc graft polymer[1] | 1.5 | 1.5 | 1.5 | 1.5 |
| Amphiphilic cleaning polymer[2] | 1.0 | 1.0 | 1.0 | 1.0 |
| Solvents | 12.0 | 12.0 | 12.0 | 12.0 |
| Inventive polyester 1 | 0.2 | — | — | — |
| Inventive polyester 2 | — | 0.2 | — | — |
| Inventive polyester 3 | — | — | 0.2 | — |
| Enzymes[3] | 0.06 | 0.06 | 0.06 | 0.06 |
| Perfume | 1.4 | 1.4 | 1.4 | 1.4 |
| Water/minors | Balance | Balance | Balance | Balance |

[1]PEG-PVAc graft polymer is a polyvinyl acetate grafted polyethylene oxide copolymer having polyethylene oxide backbone and multiple polyvinyl acetate side chains.
[2]bis($(HOCH_2CH_2(OCH_2CH_2)_n)(CH3)N^+—C_xH_{2x}N^+—(CH3)bis((CH_2CH_2O)_nCH_2CH_2OH)$, wherein n = from 20 to 30, and x = from 3 to 8, or sulphated or sulphonated variants thereof.
[3]Including protease, mannanase, amylase, pectate lyases The malodour and freshness of compositions 1, 2 and 3 (comprising inventive polyester) and composition A (not comprising inventive polyester) were evaluated using the method as described above. The malodour and freshness results are summarized in Table 4-2 below. Clear improvement on malodour and freshness can be observed from inventive polyesters.

TABLE 4-2

Malodour and freshness results

| | fabric | Composition 1 | Composition 2 | Composition 3 | Composition A |
|---|---|---|---|---|---|
| Malodor | Cotton | +1.0s | +0.8s | 0 | Reference |
| versus | Polycotton | +0.8s | +1.8s | +0.2 | Reference |
| composition A | polyester | +0.5 | +0.3s | −0.2 | Reference |
| Freshness | Cotton | 0 | 0 | −0.4 | Reference |
| versus | Polycotton | +2.1s | +4.2s | +0.8s | Reference |
| composition A | Polyester | +1.7s | +2.1s | +1.7s | Reference |

s: statistically significant

Malodor benefit of inventive polymer versus comparative polymer (Texcare® SRN 240)

Liquid detergent composition containing inventive polyester 1 (composition 4) and liquid detergent compositions B and C not comprising inventive polyester are prepared by means known to those of ordinary skill in the art by mixing the listed ingredients (see Table 4-3).

TABLE 4-3

Composition 4 comprising inventive polyester and compositions B and C not comprising inventive polyester

| | Composition 4 [wt.-%] | Composition B [wt.-%] | Composition C [wt.-%] |
|---|---|---|---|
| LAS | 8.5 | 8.5 | 8.5 |
| AES | 5.3 | 5.3 | 5.3 |
| NI 7EO | 2.8 | 2.8 | 2.8 |
| NI 9EO | 1.5 | 1.5 | 1.5 |
| Fatty Acid | 2.9 | 2.9 | 2.9 |
| Citric Acid | 5.5 | 5.5 | 5.5 |
| PEG-PVAc graft polymer[1] | 1.1 | 1.1 | 1.1 |
| Amphiphilic cleaning polymer[2] | 0.6 | 0.6 | 0.6 |
| Solvents | 5.3 | 5.3 | 5.3 |
| Perfume | 1.4 | 1.4 | 1.4 |
| Enzyme System | 0.1 | 0.1 | 0.1 |
| Inventive polyester 1 | 1.0 | 0 | 0 |
| Texcare ® SRN 240 | 0 | 1.0 | 0 |
| Water/minors | balance | Balance | Balance |

[1]PEG-PVAc graft polymer is a polyvinyl acetate grafted polyethylene oxide copolymer having polyethylene oxide backbone and multiple polyvinyl acetate side chains.
[2]bis($(HOCH_2CH_2(OCH_2CH_2)_n)(CH_3)N^+—C_xH_{2x}N^+—(CH_3)bis((CH_2CH_2O)_nCH_2CH_2OH)$, wherein n = from 20 to 30, and x = from 3 to 8, or sulphated or sulphonated variants thereof.

The malodour of composition 4 comprising inventive polyester and compositions B and C not comprising inventive polyester was evaluated using the method as described above. The malodour results are summarized in Table 4-4 below. Clear improvement on malodour can be observed from inventive polyester.

TABLE 4-4

Malodour results

| | fabric | Composition 4 | Composition B | Composition C |
|---|---|---|---|---|
| Malodor versus | Polycotton | +1.3 | 0 | Reference |
| composition C | Polyester | +2.0s | +1.25 | Reference |

s: statistically significant

Example 5: Soil Release Performance of Inventive Polyesters

Liquid detergent compositions containing polyesters of the invention and liquid detergent compositions containing no inventive polyester are prepared by means known to those of ordinary skill in the art by mixing the listed ingredients (see Table 5-1).

TABLE 5-1

| Compositions comprising inventive or no inventive polyester and used for evaluation of cleaning performance | | |
|---|---|---|
| | Detergent with inventive polyester [wt.-%] | Detergent with no polyester [wt.-%] |
| LAS | 13.4 | 13.4 |
| AES | 9.7 | 9.7 |
| NI 7EO | 6.4 | 6.4 |
| Fatty Acid | 3.0 | 3.0 |
| Citric Acid | 3.7 | 3.7 |
| Enzymes | 0.06 | 0.06 |
| PEG-PVAc graft polymer[1] | 1.5 | 1.5 |
| Amphiphilic cleaning polymer[2] | 1.0 | 1.0 |
| Solvents | 12.0 | 12.0 |
| Inventive polyester | 1.0 | 0 |
| Perfume | 1.4 | 1.4 |
| Water/minors | Balance | Balance |

[1]PEG-PVAc graft polymer is a polyvinyl acetate grafted polyethylene oxide copolymer having polyethylene oxide backbone and multiple polyvinyl acetate side chains.
[2]bis($HOCH_2CH_2(OCH_2CH_2)_n$)($CH_3$)$N^+$—$C_xH_{2x}N^+$—($CH_3$)bis(($CH_2CH_2O$)$_n$$CH_2CH_2OH$), wherein n = from 20 to 30, and x = from 3 to 8, or sulphated or sulphonated variants thereof.

The detergent compositions were tested for their soil release performance according to the "Dirty-Motor Oil" Test (DMO-Test) using a Lini Apparatus under the following conditions (see Table 5-2).

TABLE 5-2

| Conditions for testing of soil release performance | |
|---|---|
| Equipment | Linitest Plus (SDL Atlas) |
| Water hardness | 14° dH |
| Washing temperature | 40° C. |
| Washing time | 30 minutes |
| Detergent concentration | 4 g/l liquid detergent |
| Soiled Fabric:Liquor Ratio | 1:40 |

As test fabric, white polyester standard swatches (WFK 30A from WFK Testgewebe GmbH) were used. The fabrics were prewashed three times with the liquid detergent compositions. The swatches were then rinsed, dried and soiled with 25 μl of dirty motor oil. After 1 hour the soiled fabrics were washed again with the same stored laundry detergent compositions used in the pre-washing step. After rinsing and drying the washed swatches, a measurement of the remission of the stained fabric at 457 nm was made using a spectrophotometer (Datacolor 650).

The soil release performance is shown as an improvement in soil removal of the swatches washed with a composition containing a polyester of the invention ("with additive") compared with the same composition containing no soil release polyester ("without additive"):

$$\Delta R = R_{with\ additive} - R_{without\ additive}$$

The washing results obtained for the laundry detergent compositions comprising the polyesters of the invention are expressed as ΔR along with the standard deviations (SD) (see Table 5-3).

TABLE 5-3

| Soil release test results | | |
|---|---|---|
| | Soil release test result | |
| Polyester | ΔR | SD |
| Inventive polyester example 1 | 14.6 | 0.9 |
| Inventive polyester example 2 | 16.7 | 0.4 |
| Inventive polyester example 3 | 15.6 | 0.4 |
| Inventive polyester example 4 | 11.8 | 1.6 |
| Inventive polyester example 5 | 22.2 | 1.6 |
| Inventive polyester example 6 | 27.9 | 3.2 |
| Inventive polyester example 7 | 30.6 | 1.9 |
| Inventive polyester example 8 | 16.8 | 4.0 |
| Inventive polyester example 10 | 23.4 | 2.5 |
| Inventive polyester example 11 | 18.5 | 3.2 |
| Inventive polyester example 12 | 17.1 | 2.3 |
| Inventive polyester example 14 | 15.7 | 2.5 |
| Inventive polyester example 17 | 20.7 | 2.8 |

The results suggest that inventive polyesters show very good soil release efficacy (see results in Table 5-3 for inventive polyesters 1-8, 10-12, 14 and 17).

Example 6: Method of Measuring Bacteria Adhesion

Bacteria adhesion benefits of compositions comprising inventive polyester or comparative polyester are evaluated using the method described below.

Step 1: Preparation

Detergent solutions for fabric pre-treatment are prepared by adding polyester stock solution comprising inventive polyester or comparative polyester into 1000 ppm solution of base detergent in de-ionized (DI) water. Solution of 1000 ppm base detergent and 5 ppm inventive or comparative polyester are used in this specific test.

Step 2: Pre-Treat of Fabrics 3 pieces of fabric (1 cm disks, polyester or cotton) are sterilized and placed into a 50 ml centrifuge tube using sterilized tweezers, then filled with 30 ml detergent solutions prepared above. After agitating in the centrifuge for 20 minutes at 40 RPM (rounds per minute), the wash liquor was poured out and replaced with sterile DI water and rinsed for 5 minutes.

The same fabric disks are washed/rinsed following the above process for another 3 times, each time using a freshly made detergent solution prepared following step 1.

Step 3: Inoculation and Extraction of Bacteria

The treated fabric disks were placed in 12 well microtitre plate (one disk per individual well) and let dry for 1 hour. 20 μl of the $10^8$ cfu/ml bacterial suspension (such as *Klebsiella pneumonia*) are added into each well that contains a fabric disk and incubated at 32° C. for 20 minutes.

Then the fabric disks are washed and rinsed again once following the wash/rinse process described in Step 2, using a freshly made detergent solution prepared following Step 1.

After wash, each fabric disk is moved into labelled vials of neutralizer broth (9 ml) and vortex for 30 seconds at speed setting 7 to extract the bacteria into broth. This suspension is labeled as 1× diluted suspension.

Take 1 ml of each of above 1× diluted suspension and dilute with another 9 ml of neutralizer broth, the diluted suspension is labeled as 2× diluted suspension.

Take 1 ml of each of above 2× suspension and dilute with another 9 ml of neutralizer broth, the diluted suspension is labeled as 3× diluted suspension.

Pipette 100 μl of each 1×, 2×, 3× diluted suspension onto a 55 mm agar plate containing TSA (Tryptic Soy agar, purchased from Merck), thoroughly spread across the plate using a spreader. Incubate the plates overnight at 32° C. Count the number of colonies on each plate, recording "too many too count" (Tmtc) where the mass of bacterial cells have formed a continuous lawn.

Bacteria Adhesion Test

Base detergent formulations below are prepared by means known to those of ordinary skill in the art by mixing the listed ingredients for the bacteria adhesion test (see Table 6-1).

TABLE 6-1

| Base detergent formulation | |
|---|---|
| | active [wt.-%] |
| LAS | 10.2 |
| AES | 1.4 |
| NI 7EO | 6.1 |
| $C_{12}$-$C_{14}$ alkyl dimethyl amine oxide | 0.5 |
| $C_{12}$-$C_{18}$ Fatty Acid | 2.5 |
| Citric acid | 1.2 |
| Ethanol | 1.7 |
| NaCS | 4.4 |
| Na-DTPA | 0.18 |
| Alkoxylated Polyethyleneimine[a] | 1.1 |
| Alkoxylated Polyethyleneimine[b] | 0.8 |
| MEA | 1.3 |
| Tinosan HP100 | 0.05 |
| Calcium chloride | 0.03 |
| Perfume | 0.12 |
| Hydrogenated castor oil derivative structurant | 0.12 |
| Water/minors | Balance |

[a]Polyethylenimine (MW = 600) with 20 ethoxylate groups per —NH on average,

[b]Polyethylenimine (MW = 600) with 24 ethoxylate groups and 16 propoxylate group per —NH on average.

The bacteria adhesion of inventive polyesters and comparative polyester (Texcare® SRN 260) are tested according to the method of this Example. Surprisingly, inventive polyesters provide much better bacteria adhesion prevention benefit versus the comparative polyester. Such bacteria adhesion reduction effect is shown for *Klebsiella pneumoniae* in the following Table 6-2.

TABLE 6-2

| results of bacteria adhesion tests | | | |
|---|---|---|---|
| | Plate Count (*Klebsiella pneumoniae*) | | |
| Polyester | 1X | 2X | 3X |
| Texcare ® SRN260 | Tmtc | Tmtc | Tmtc |
| Inventive polyester 4 | Tmtc | 97 | 7 |
| Inventive polyester 6 | Tmtc | 146 | 17 |
| Inventive polyester 1 | Tmtc | 119 | 15 |
| Inventive polyester 9 | Tmtc | 139 | 24 |

The invention claimed is:

1. A polyester comprising:

A) one or more structure units of the formula (I)

(I)

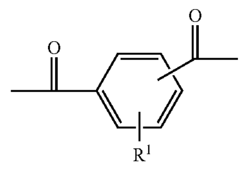

wherein:

$R_1$ is H or $SO_3$-1/p $M^{p+}$, and

1/p $M^{p+}$ is a cation, and

B) one or more structure units of the formula (II)

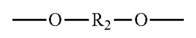

(II)

wherein:

$R_2$ is a linear or branched alkylene group represented by the formula ($C_mH_{2m}$) wherein m is an integer from 2 to 10, and C) one or more structure units selected from the group consisting of the formulae (III-a), (III-b), (III-c) and combinations thereof, (III-a)

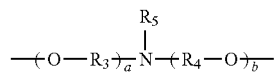

(III-b)

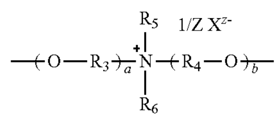

(III-c)

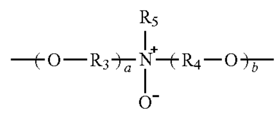

wherein:

$R_3$ and $R_4$ are, independently of one another, selected from linear or branched alkylene groups represented by the formula ($C_nH_{2n}$) wherein n is 2, 3 or 4, $R_5$ is a group of the formula —$(C_jH_{2j}O)_k$—$R_{98}$, wherein j is 2, 3 or 4, k is, based on a molar average, a number from 0 to 10, and $R_{98}$ is selected from the group consisting of alkyl, alkenyl, hydroxyalkyl, hydroxyalkenyl, phenyl alkyl, phenyl alkenyl, alkyl phenyl, and alkenyl phenyl, wherein the alkyl and alkenyl groups, either as such or as a part of the aforementioned hydroxyalkyl, hydroxyalkenyl, phenyl alkyl, phenyl alkenyl, alkyl phenyl or alkenyl phenyl groups, contain 6 or more than 6 carbon atoms, $R_6$ is a group of the formula —$(C_{j1}H_{2j1}O)_{k1}$—$R_{99}$, wherein j1 is 2, 3 or 4, k1 is, based on a molar average, a number from 0 to 10, and $R_{99}$ is selected from the group consisting of hydrogen, alkyl, alkenyl, hydroxyalkyl, hydroxyalkenyl, phenyl alkyl, phenyl alkenyl, alkyl phenyl, and alkenyl phenyl, wherein the alkyl groups, either as such or as a part of the aforementioned hydroxyalkyl, phenyl alkyl or alkyl phenyl groups, contain from 1 to 30 carbon atoms, and wherein the alkenyl groups, either as such or as a part of the aforementioned hydroxyalkenyl, phenyl alkenyl or alkenyl phenyl groups, contain from 2 to 30 carbon atoms, a and b are, based on a molar average, independently of one another, numbers from 1 to 200, 1/z $X^{z-}$ is an anion; and D) one or more terminal groups (IV) derived from polyalkyleneglycol monoalkylethers.

2. A polyester according to claim 1, characterized in that $R_1$ is H.

3. A polyester according to claim 1, characterized in that $R_2$ is selected from the group consisting of $(C_2H_4)$, $(C_3H_6)$ and mixtures thereof.

4. A polyester according to claim 1, characterized in that $R_3$ and $R_4$ are $(C_2H_4)$.

5. A polyester according to claim 1, characterized in that a and b are 1.

6. A polyester according to claim 1, characterized in that $R_{98}$ is selected from the group consisting of alkyl, alkenyl and mixtures thereof and wherein the alkenyl groups comprise one or more double bonds.

7. A polyester according to claim 1, characterized in that $R_{99}$ is linear or branched.

8. A polyester according to claim 1, characterized in that it further comprises one or more polyalkyleneglycol-derived structure units (V).

9. A polyester according to claim 1 or 8, characterized in that the combined amount of the one or more structure units of the formula (I), and the one or more structure units of the formula (II), and the one or more structure units selected from the group consisting of the formulae (IIIa), (III-b), (III-c) and combinations thereof, and wherein the one or more terminal groups (IV) derived from polyalkyleneglycol monoalkylethers, and, when present, one or more polyalkyleneglycol-derived structure units (V), is at least 50 wt.-%, based on the total weight of the polyester.

10. A polyester according to claim 1 or 8, characterized in that it consists exclusively of one or more structure units of the formula (I), and of one or more structure units of the formula (II), and of one or more structure units selected from the group consisting of the formulae (III-a), (III-b), (III-c) and combinations thereof, and of one or more terminal groups (IV) derived from polyalkyleneglycol monoalkylethers, and, if present, of one or more polyalkyleneglycol-derived structure units (V).

11. A polyester according to claim 1, characterized in that the amount of the one or more terminal groups (IV), based on the total weight of the polyester, is at least 40 wt.-%.

12. A polyester according to claim 1, characterized in that its weight average molecular weight (Mw) is from 2,000 g/mol to 20,000 g/mol.

13. A process for the preparation of a polyester comprising the steps of: heating one or more substances of the formula $Q_1$-OOC—$C_6H_3R_1$—COO-$Q_2$, wherein $Q_1$ and $Q_2$, independently of one another, are selected from the group consisting of H and $(C_1-C_4)$-alkyl and $R_1$ is H or $SO_3$-1/p $M^{p+}$, and one or more glycols of the formula HO—$R_2$—OH, wherein $R_2$ is a linear or branched alkylene group represented by the formula $(C_mH_{2m})$ wherein m is an integer from 2 to 10, and one or more amine alkoxylates of the formula

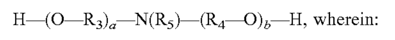

$R_3$ and $R_4$ are, independently of one another, selected from linear or branched alkylene groups represented by the formula $(C_nH_{2n})$ wherein n is 2, 3 or 4, $R_5$ is a group of the formula —$(C_jH_{2j}O)_k$—$R_{98}$, wherein j is 2, 3 or 4, k is, based on a molar average, a number from 0 to 10, and $R_{98}$ is selected from the group consisting of alkyl, alkenyl, hydroxyalkyl, hydroxyalkenyl, phenyl alkyl, phenyl alkenyl, alkyl phenyl, and alkenyl phenyl, wherein the alkyl and alkenyl groups, either as such or as a part of the aforementioned hydroxyalkyl, hydroxyalkenyl, phenyl alkyl, phenyl alkenyl, alkyl phenyl or alkenyl phenyl groups, contain 6 or more than 6 carbon atoms, and a and b are, based on a molar average, independently of one another, numbers from 1 to 200;

with the addition of a catalyst, to temperatures of 160° C. to 220° C., and then continuing the reaction under reduced pressure at temperatures of from 160° C. to 240° C.

14. A solution or dispersion comprising one or more polyesters according to claim 1, and one or more solvents selected from the group consisting of water, ethanol, propanol, butanol, ethylene glycol, 1,2-propylene glycol, 1,3-propylene glycol, 1,2-butylene glycol, 1,3 butylene glycol, 1,4-butylene glycol, butyl glycol, butyl diglycol, butyl polyglycol and mixtures thereof.

15. A solution or dispersion comprising one or more polyesters according to claim 1, in an amount of from 25 wt.-% to 70 wt.-%, based on the total weight of the solution or dispersion, and one or more solvents selected from the group consisting of water, ethanol, propanol, butanol, ethylene glycol, 1,2-propylene glycol, 1,3-propylene glycol, 1,2-butylene glycol, 1,3 butylene glycol, 1,4-butylene glycol, butyl glycol, butyl diglycol, butyl polyglycol and mixtures thereof in an amount of from 25 wt.-% to 75 wt.-% based on the total weight of the solution or dispersion.

16. A polyester according to claim 1, characterized in that it further comprises one or more terminal groups (IV) derived from polyalkyleneglycol monoalkylethers, according to the formula (IV-a)

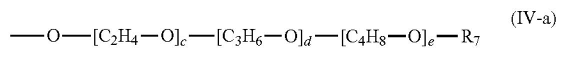

wherein $R_7$ is linear or branched $(C_1-C_{30})$-alkyl, c, d and e are, based on a molar average, independently of one another, numbers from 0 to 200, the sum of c+d+e is from 2 to 500, the $[C_2H_4—O]$, $[C_3H_6—O]$ and $[C_4H_8—O]$ groups of the terminal group (IV-a) may be arranged blockwise, alternating, periodically and/or statistically, and either of the $[C_2H_4—O]$, $[C_3H_6—O]$ and $[C_4H_8—O]$ groups of the terminal group (IV-a) can be linked to —$R_7$ and/or —O.

17. A polyester according to claim 1, characterized in that 1/p $M^{p+}$ is selected from the group consisting of $H^+$, $Li^+$, $Na^+$, $K^+$, ½$Mg^{2+}$, ½$Ca^{2+}$, ⅓$Al^{3+}$, $NH_4^+$ and $R^aR^bR^cR^dN^+$, wherein $R^a$, $R^b$, $R^e$ and $R^d$, independently of one another, are H, linear or branched, and wherein in the cations $R^aR^bR^cR^dN^+$ at least one of $R^a$, $R^b$, $R^e$ and $R^d$ is not H.

18. A polyester according to claim 1, characterized in that ½$X^{z-}$ is selected from the group consisting of $Cl^-$, $Br^-$, $CH_3—SO_4^-$, $C_2H_5—SO_4^-$, $HCOO^-$, ⅓$C(OH)(COO^-)(CH_2COO^-)_2$, $CH_3—COO^-$, $NO_3^-$, ½$CO_3^{2-}$, ½$SO_4^{2-}$, and ⅓$PO_4^{3-}$.
19. A polyester according to claim 1, characterized in that it further comprises one or more polyalkyleneglycol-derived structure units (V), selected from the formula (V-a)
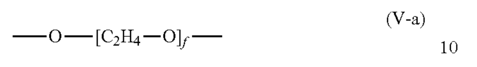
(V-a)
wherein
f is, based on a molar average, a number from 2 to 500.
* * * * *